US012748781B2

(12) United States Patent
Lindner

(10) Patent No.: US 12,748,781 B2
(45) Date of Patent: Sep. 29, 2026

(54) MANAGING DATA PROCESSING EFFICIENCY, AND APPLICATIONS THEREOF

(71) Applicant: H1 Insights, Inc., New York, NY (US)

(72) Inventor: Robert Raymond Lindner, Fitchburg, WI (US)

(73) Assignee: H1 Insights, Inc., New York, NY (US)

( * ) Notice: Subject to any disclaimer, the term of this patent is extended or adjusted under 35 U.S.C. 154(b) by 0 days.

(21) Appl. No.: 18/812,584

(22) Filed: Aug. 22, 2024

(65) Prior Publication Data

US 2025/0231966 A1 Jul. 17, 2025

Related U.S. Application Data

(63) Continuation of application No. 17/699,358, filed on Mar. 21, 2022, now Pat. No. 12,111,849, which is a continuation of application No. 16/731,258, filed on Dec. 31, 2019, now Pat. No. 11,314,782, which is a continuation of application No. 15/072,111, filed on Mar. 16, 2016, now Pat. No. 10,521,456.

(51) Int. Cl.

| | |
|---|---|
| ***G06F 16/00*** | (2019.01) |
| ***G06F 16/215*** | (2019.01) |
| ***G06F 16/2458*** | (2019.01) |
| ***G06F 16/28*** | (2019.01) |
| ***G06F 40/205*** | (2020.01) |

(52) U.S. Cl.

CPC .......... *G06F 16/285* (2019.01); *G06F 16/215* (2019.01); *G06F 16/2465* (2019.01); *G06F 40/205* (2020.01)

(58) Field of Classification Search

None

See application file for complete search history.

(56) References Cited

U.S. PATENT DOCUMENTS

| | | | |
|---|---|---|---|
| 6,381,031 | B1 | 4/2002 | Mishima |
| 10,521,456 | B2 | 12/2019 | Lindner |
| 11,314,782 | B2 | 4/2022 | Lindner |
| 12,111,849 | B2 | 10/2024 | Lindner |
| 2004/0172393 | A1 | 9/2004 | Kazi et al. |
| 2010/0223349 | A1 | 9/2010 | Thorson |
| 2013/0097157 | A1 | 4/2013 | Ng et al. |
| 2013/0185306 | A1 | 7/2013 | Botros |

(Continued)

*Primary Examiner* — Bai D Vu

(74) *Attorney, Agent, or Firm* — Sterne, Kessler, Goldstein & Fox P.L.L.C.

(57) ABSTRACT

The present disclosure relates to a system, method, and computer program product for linking data records in memory. An embodiment includes accessing a first record stored in memory. The first record holds information describing a first person and accessing at least one additional record stored in memory. The additional records hold information describing additional persons. The embodiment continues by parsing the information of the first record and additional record and assigning the parsed information to predefined categories within the respective records. After assigning the information into categories, the embodiment determines a similarity score between categorical information in the first record and categorical information of additional records. The embodiment then modifies a category of an additional record based on the similarity score to associate the additional record with the first person.

20 Claims, 5 Drawing Sheets

(56) References Cited

U.S. PATENT DOCUMENTS

| | | | |
|---|---|---|---|
| 2013/0293558 | A1 | 11/2013 | George et al. |
| 2014/0304306 | A1 | 10/2014 | Proctor et al. |
| 2015/0073929 | A1 | 3/2015 | Psota et al. |
| 2016/0092557 | A1 | 3/2016 | Stojanovic et al. |
| 2017/0091303 | A1 | 3/2017 | Rashid et al. |
| 2017/0091393 | A1 | 3/2017 | Muhammad et al. |
| 2018/0137150 | A1* | 5/2018 | Osesina ................ G06F 16/215 |
| 2022/0318274 | A1 | 10/2022 | Lindner |

* cited by examiner

MANAGING DATA PROCESSING EFFICIENCY, AND APPLICATIONS THEREOF

CROSS-REFERENCED TO RELATED APPLICATIONS

This application is a Continuation of U.S. application Ser. No. 17/699,358, filed on Mar. 21, 2022, which is a Continuation of Ser. No. 16/731,258, filed on Dec. 31, 2019 (issued as U.S. Pat. No. 11,314,782), which is a Continuation of U.S. application Ser. No. 15/072,111 (issued as U.S. Pat. No. 10,521,456), filed Mar. 16, 2016, both of which are incorporated herein by reference in their entireties.

FIELD OF THE INVENTION

The present invention relates generally to the field of data mining. In particular, the present invention relates to a computer-based system, method, and device that can link a number of data records describing a single individual.

BACKGROUND

Systems exist for collecting information describing characteristics or behavior of separate individuals. Collecting such personal information has many applications, including in national security, law enforcement, marketing, and other fields. An action or transaction may generate data records specific to that action and the individual who performed it. For example, the major credit bureaus maintain and lawfully sell access to databases of personal financial data records for nearly every individual with a line of credit, a credit card, auto loan, mortgage, etc. in the United States. As another example, databases with information describing mortgage information are also lawfully available.

As technology advances, an ever increasing amount of personal data is becoming digitized, and as a result, more and more personal data is becoming lawfully accessible. The increased accessibility of personal data has spawned new industries focused on lawfully mining personal data.

A personal data record may include a number of categories. A data record representing an individual mortgage may include categories such as the name of the individual, his or her city, state, and ZIP code, the individual's employer, the name of the mortgage provider, the interest rate, and the amount of the loan. Data records from different sources may comprise different categories.

Databases of personal data records may contain distinct records corresponding to the same individual. For example, an individual may have multiple mortgages over the course of a lifetime. Other types of lawfully available databases may maintain a single data record for an individual or social security number. Such records may be updated periodically or as events occur that affect the accuracy of an individual's data record.

For this reason, correlating, or linking, different data records describing the same person can be challenging because contact information for the same individual can change over time. As records receive more updates from different sources, they also have a greater risk of inconsistency and errors associated with data entry. In these ways, data records all describing the same individual can be incongruous, inconsistent, and erroneous in their content.

To link incongruous data records, improved methods and systems are needed.

BRIEF SUMMARY

The present disclosure provides an improved system for linking personal and/or entity data records. In an embodiment, the present disclosure provides a method for linking data records in memory. The method includes accessing a first record stored in memory, the first record holding information describing a first person and accessing at least one additional record stored in memory, the additional records holding information describing additional persons. The method continues by parsing the information of the first record and additional records, based on a dynamic set of rules and assigning the parsed information to predefined categories within the respective records. After assigning the information into categories, the method advances by determining a similarity score between categorical information in the first record and categorical information of additional records. When applicable, at least one category of an additional record is then modified based at least in part on the similarity score, so the additional record is associated with the first person.

System and computer program products are also disclosed.

Further embodiments, features, and advantages of the invention, as well as the structure and operation of the various embodiments, are described in detail below with reference to accompanying drawings.

BRIEF DESCRIPTION OF THE DRAWINGS

A further understanding of the present disclosure can be obtained by reference to the preferred embodiment and alternate embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this disclosure, which is set forth with particularity in the claims as appended or as subsequently amended, but merely to clarify and exemplify the invention. For a more complete understanding of the present disclosure, reference is now made to the following drawings in which:

In the drawings, like reference numbers generally indicate identical or similar elements. Additionally, generally, the left-most digit(s) of a reference number identifies the drawing in which the reference number first appears.

DETAILED DESCRIPTION

As discussed above, a need exists for an improved technique for linking incongruous data records that describe a common individual. Current data mining systems lack the ability to obtain hundreds, thousands, or millions of data records and adequately determine whether any of the records describe a common individual. For example, no data mining system has the ability to link each other record of the same individual. And no data mining system has the ability to link an individual's information with a diverse set of data records describing the individual's personal interests.

Embodiments disclosed herein provide that ability by comparing different attributes describing the individual and determining a similarity score based on the comparison. The similarity score may increase when attributes across different data records match, and decrease when they do not match. When the similarity score exceeds a threshold, the different data records are determined to represent the same person. Additional detail on different embodiments is provided below.

For illustrative purposes, embodiments below are described with respect to political donor information. A skilled artisan would recognize that the techniques disclosed herein can be applied to other sorts of personal and/or entity information as well.

A detailed illustrative embodiment of the present invention is disclosed herein. However, techniques, systems and operating structures in accordance with the present disclosure may be embodied in a wide variety of forms and modes, some of which may be quite different from those in the disclosed embodiment. Consequently, the specific structural and functional details disclosed herein are merely representative, yet, in that regard, they are deemed to afford the best embodiment for purposes of disclosure and to provide a basis for the claims herein, which define the scope of the present invention. The following presents a detailed description of a preferred embodiment, as well as alternate embodiments such as a simpler embodiment or more complex embodiments for alternate devices of the present invention.

Figure 1:
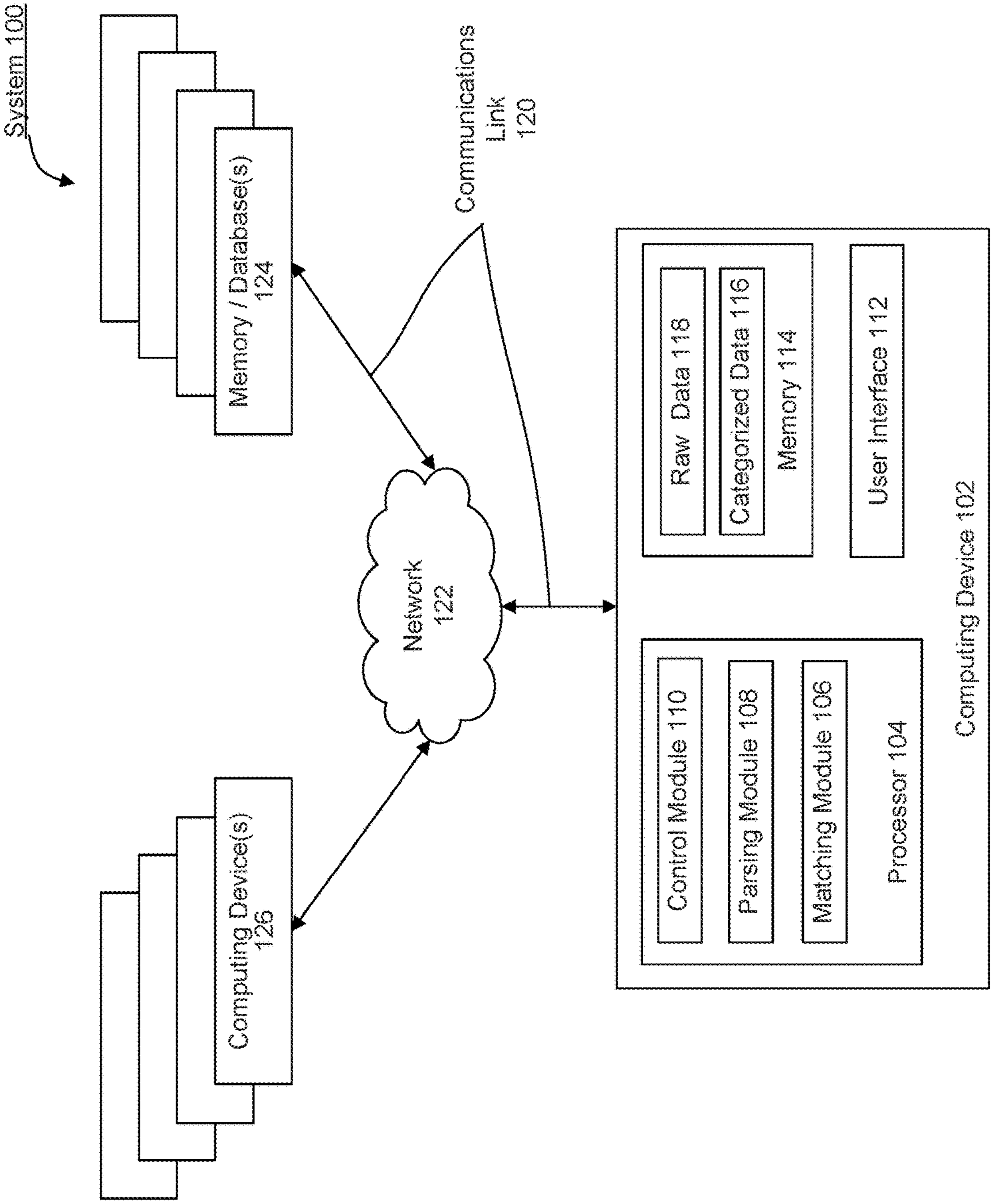
FIG. 1 depicts a schematic of an exemplary data linking system.

FIG. 1 illustrates a schematic of an exemplary data linking system 100, capable of satisfying the aforementioned needs. Data linking system 100 is useful for implementing various embodiments of the present disclosure. As depicted, data linking system 100 includes a computing device 102 in electronic communication with computing device(s) 126 and memory/database(s) 124 via network 122 and communications link 120.

In an embodiment, computing device 102 includes one or more features that provide functionality for obtaining, parsing, normalizing, and linking a number of data records. Computing device 102 also includes one or more features to combine and link an individual donor's political donation information with a diverse set of data records that describe the individual's non-political interests.

Computing system 102 includes at least one processor (also called central processing unit, or CPU), such as processor 104. As shown, processor 104 executes three software modules: control module 110, parsing module 108, and matching module 106. Each is described in turn.

Control module 110 determines a current data processing need based on the amount of data to be processed. Depending on the current processing need, control module 110 can either recruit additional computing device(s) 126 to aid in parsing and processing the data records or, alternatively, control module 110 may shut down one of the additional devices. An example operation of control module 110 is described in greater detail with respect to FIG. 4 below.

Parsing module 108 is capable of accessing raw data 118 stored on local memory 114, or accessing raw data stored externally in database or memory 124. Raw data may, for example, be data that does not have its individual fields labeled, or data that may not follow a particular structure. Upon accessing the raw data, either locally or externally, parsing module 108 parses the data within each record and assigns the parsed data to predetermined categories within the respective records. The parsed and assigned records are then normalized based on a predetermined criteria. In an embodiment, parsing module 108 may further cause the parsed and assigned records to be stored on local memory 114, or externally in memory/database(s) 124. In an additional embodiment, mirrors of the parsed and assigned data are stored both locally and throughout a network.

Matching module 106 compares categorized data. The categorized data may be retrieved from parsing module 108, from local memory 114, or from memory/database(s) 124. In an embodiment, matching module 106 compares the categorized data of two records using a pair-wise function. Based on the comparison, matching module 106 calculates a similarity score for each pair. In an embodiment, when the similarity score exceeds a predetermined threshold, matching module 106 links and/or combines the similar records such that each record is linked to, or describes, a common individual. An example operation of parsing module 108 and matching module 106 is described in greater detail with respect to FIG. 5 below.

For purposes of this discussion, the term "module" shall be understood to include at least one of software, firmware, and hardware (such as one or more circuit, microchip, processor, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner. As such, one or more modules may be used alone (or in combination) to provide improved systems, methods, and devices for obtaining, parsing, normalizing, and linking a number of data records.

Computing device 102 also includes memory 114 connected to a communication infrastructure or bus. In an embodiment, memory 114 may be implemented as a main or primary memory, such as random access memory (RAM). Memory 114 may include one or more levels of cache. Additionally, memory 114 has stored therein control logic (i.e., computer software) and/or data such as raw data 118 and/or normalized data 118. Computing device 102 may also include one or more secondary storage devices or memory (not shown). In an embodiment, memory/database(s) 124 may be implemented as secondary memory. Secondary memory may include, for example, a hard disk drive, a removable storage device/drive, or any other storage device/drive that can be accessed locally or over a network connection and/or communications link, such as network 122.

Both computing device 102 and computing device(s) 126 can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Figure 2:
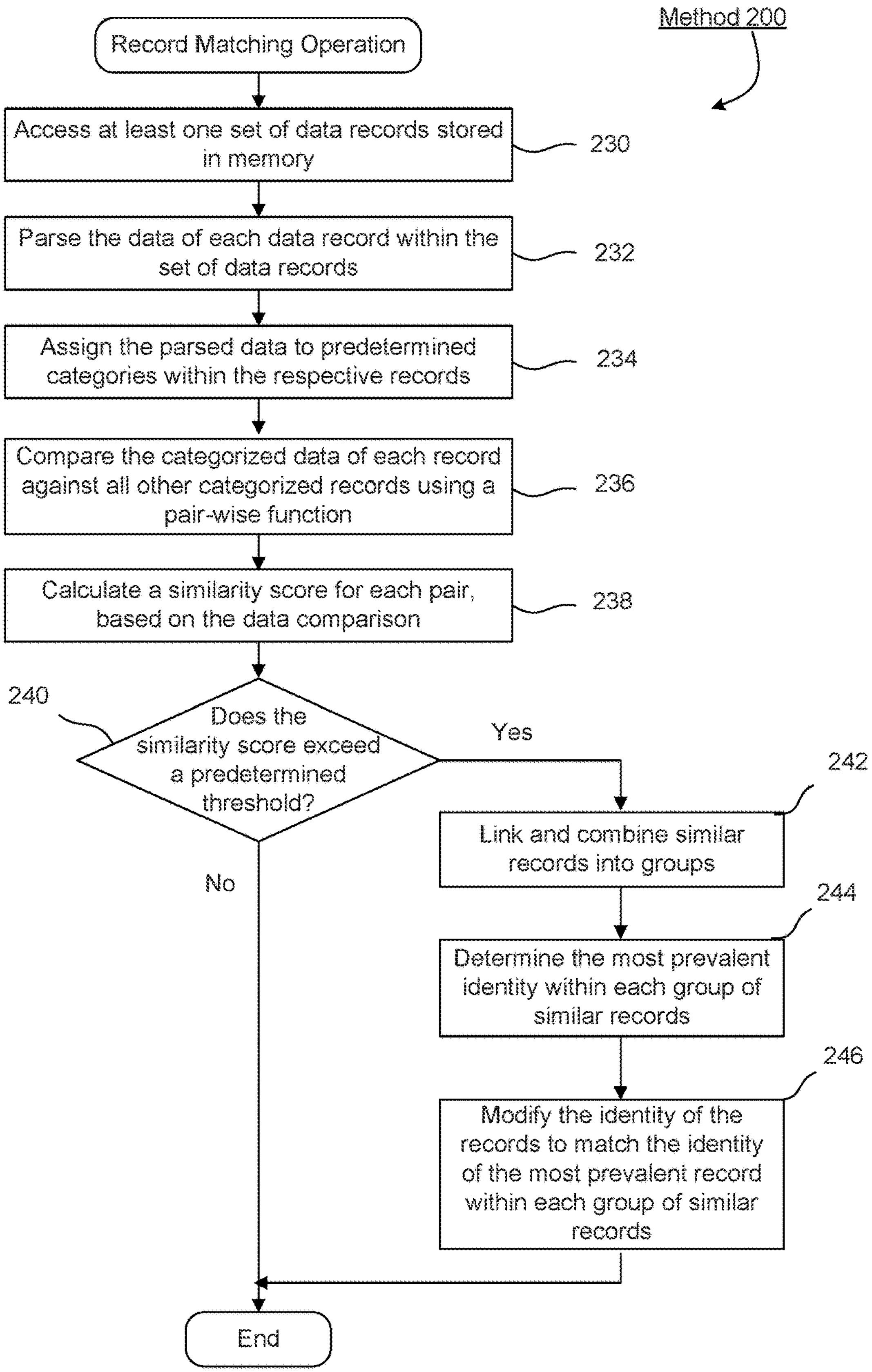
FIG. 2 depicts a flow chart diagram of an exemplary method for linking and matching data records.

FIG. 2 illustrates a flowchart diagram of an exemplary method 200, useful for implementing various embodiments of the present disclosure. As shown, method 200 describes an embodiment for matching and linking records using embodiments of the foregoing system. The term "matching" refers to determining that two or more personal data records correspond to the same individual. For illustrative purposes, method 200 is sometimes described with respect to components of FIG. 1. However, it should not be limited thereto.

At step 230, a processor such as processor 104 or computing device(s) 126 lawfully accesses at least one set of data records stored in a memory such as memory 114 or memory/database(s) 124. In an embodiment, the set of data records may include: a generated list, such as a person of interest or a client, patron, and/or customer list; tax forms, such as a contribution database detailing an individual's political contributions; consumer data, such as an individual's purchasing history; web-browsing data, such as an individual's browsing and/or web-purchase history, tracked using first- or third-party cookies; an individual's mortgage information; or any other personal data that may be tracked or purchased through commonly used methods. All of the data is lawfully accessed and retrieved from the various external sources.

In some instances, the accessed data records may be received and/or stored in an undesirable format or in a format that is not compatible with the contemplated method and system. In such embodiments, the data record is cleaned or normalized to be consistent with a predetermined format.

At step 232, the processor parses the data of each accessed record. In an embodiment, this parsing step is conducted using control logic that defines a set of dynamic rules. In an embodiment, the control logic may be trained to parse a data record and locate an individual's first name, last name, home address, email address, telephone number, social security number, occupation, donation amount, purchase price, asset identity, asset value, or any other demographic or personal information that describes an individual associated with the parsed data record. In an additional embodiment, the control logic may dictate a persistent set of rules based on the data record type being parsed.

At step 234, the processor assigns the parsed data to predetermined categories within the respective records. For example, an embodiment may include parsing rules for finding an individual's first name, last name, address, email address, and phone number. In such an embodiment, as the processor finds the first name, last name, and so on, a temporary file may be created within the data record where the first name, last name, etc., are assigned to a corresponding category. In an additional embodiment, a new persistent file may be created to store the categorized data. For example, a new record may be created as a new row in a database table or memory and the different categories are each entered as a column value in the row. In yet another embodiment, the processor may assign the categorized data and store the assigned and categorized data as metadata within the original file.

At step 236, in an embodiment having one set of data records, the processor compares the categorized data of each record against all other categorized records using a pair-wise function. For example, the processor compares the categorized data of a first record against the categorized data of a second record. In an embodiment, the processor compares a single category. For example, the processor compares the address associated with the first record against the address associated with the second record to determine whether they are the same. Alternatively, other possible categories may be compared, including first name, last name, email address, social security number, or any other identifying information. In an additional embodiment, the processor compares more than one category of data. For example, the processor may compare the first name, last name, and email address associated with the first record against the first name, last name, and email address of the second record to determine whether they are the same. The processor may track which categories match and which do not. Alternatively, the processor may merely count the number of categories that match. It is contemplated that step 236 may include comparing more than three categories. For example, in an embodiment the processor compares up to seven categories. In yet additional embodiments, the processor compares between eight and 20 categories.

The categories used to compare the data records may be selected in accordance with a customized index. A customized index is a predetermined group of categories designed to compare a specific subset of categories. For example, in an embodiment, a customized index may only include first and last name categories. In an additional embodiment, the customized index may include zip code, annual reported income, and mortgage amount. In yet another embodiment, the customized index may include car type, consumer purchasing habits, and education information. The index may be customized based on the motivation for comparing the data records.

In embodiments, step 236 may employ not just literal matching, but also other types of matching such as regular expression matching or fuzzy matching. Regular expression matching may determine that two values match when they both satisfy the same regular expression. Fuzzy matching may detect matches when two strings that match a pattern approximately (rather than exactly).

In embodiments, step 236 may be conducted using multiple sets of data records. For example, data records from a first set of records may be compared against data records from a second set of records using the method and system described herein. In an embodiment, the first set of data records may be an input list including a data record describing a person of interest or a list of persons of interest. The second set of data records may be personal data records from a second input list or lawfully stored in a database. Comparing multiple sets of data records is performed to determine whether a record of the first set of data records and record of the second set of data records describe the same individual.

Further, in embodiments conducted using multiple sets of data records, the second set of data records may hold ground-truth identities, identities having a confirmed accuracy, and/or identities exceeding a predetermined accuracy threshold. The ground-truth identities may be encoded as a serial number.

In additional embodiments, the data records (Records X and Records Y) from two entities (Entity X and Entity Y), may be encrypted or cryptographically obfuscated using: a coordinated sequence of reversible cryptographic algorithms (e.g., a private encryption key selected by the respective entities); irreversible cryptographic algorithms (e.g., a hash function with a privately selected hash key); and/or exchanges of information, data, or encrypted records between the two entities, so that the net result is Records X and Records Y being transformed with composite cryptographic functions. For example, composite cryptographic functions (Function 1 and Function 2) which may produce identical outputs for the same given input, but neither of which is fully known by Entity X or Entity Y. After this coordinated encryption sequence, Entity X or Entity Y can use the present disclosure to compare records between the encrypted Records X and encrypted Records Y in a way that would not inhibit the methods described herein. Because neither Entity X or Entity Y, or any party with access to computing device 102, knows the full final cryptographic algorithm, no entity could decrypt the encrypted Records X or encrypted Records Y. For example, in an embodiment, consider a commutative encryption or hashing function that satisfies kpX(kpY(Data))=kpY(kpX(Data)) for secret keys "kpX" and "kpY". In such an embodiment, Entity X may hash their data with private key "kpX". Entity Y hashes their data with private key "kpY". The entities may trade their hashed data files and apply their own private key to the other entity's data file. Thus, Entity X is holding data file kpX (kpY(Data-Y)) and Client Y is holding data file kpY(kpX (Data-X)). The two encrypted files may be compared using the methods and system described herein, but in a secure manner. In other embodiments, additional encryption schemes may be used to protect the contents of the data files.

In one embodiment, the ability for two entities to compare lists of individuals, treatment methods utilized for those individuals, and/or related health data, without revealing individual patient identities or other sensitive data. In another embodiment, the present disclosure may be applied to epidemiology research, by allowing hospitals and clinics to anonymously compare patient lists in order to track patients that are infected by spreading viruses. In another embodiment, the anonymous matching may be used by healthcare providers and regulators in order to track providers and patients suspected of fraud.

At step 238, the processor calculates a similarity score for each data pair based on the data comparison. More specifically, the processor calculates a similarity score for each data pair based on which categories in the pair of records are determined to match in step 236. In an embodiment, the similarity score is calculated as a ratio. For example, in an embodiment where seven categories are compared, if the first and second records describe data such that five of the seven categories are the same between the records, the similarity score is 5/7. In an additional embodiment, the similarity score is calculated as a percentage. For example, in an embodiment where 20 categories are compared, if the first and second records describe data such that 16 of the 20 categories are the same between the records, the similarity score is 0.8 or 80%.

In another embodiment, each category may be assigned a weight, and the similarity score may be determined in step 230 based on whether each category matches and the respective weights associated with the matching categories. The weights may be determined using a training set. In one example, the weights may be determined using linear programming. In other examples, neural networks or other adaptive learning algorithms may be used to determine a similarity score for a pair of data records based on which categories in the pair match.

At step 240, the processor determines whether the calculated similarity score meets or exceeds a predetermined threshold. For example, in an embodiment where the similarity score threshold is 5/7 (or approx. 71.4%), the processor will determine whether the calculated similarity score meets or exceeds the 5/7 threshold. Likewise, in an embodiment where the similarity score threshold is 16/20 (or 80%), the processor will determine whether the calculated score meets or exceeds the threshold.

At step 242, if the similarity score for at least two records meets or exceeds the similarity score threshold, the similar records (i.e., records that met or exceeded the similarity score threshold) are linked, or combined into a group. For example, in an embodiment, the processor performs a pair-wise comparison between a first record and all subsequent records. Any record meeting or exceeding the similarity score threshold is linked and/or combined in a first group. The processor then performs a pair-wise comparison between the second record and all subsequent records. Assuming the second record is not linked to the first record, any subsequent record meeting or exceeding the similarity score threshold (when compared to the second record) is linked and/or combined in a second group. When comparing multiple sets of data records, step 242 is also applicable. A similarity score is calculated for each data record of the first set of data records as they relate to data records of the second set of data records. As described above, any record meeting or exceeding the similarity score threshold is linked and/or combined in a group. In an embodiment, the linked/grouped records may be programmatically linked while the linked/grouped records remain in their respective set of records.

Further at step 242, a situation may arise where the pair-wise comparison between a first and second data record produces a similarity score that meets or exceeds the threshold value. Further, the pair-wise comparison between the second and a third record also produces a similarity score that meets or exceeds the threshold value, however, the pair-wise comparison between the first and third records were not similar and did not meet the threshold value. The processor may handle this conflicted grouping scenario in a number of ways. For example, in an embodiment, the processor may compare additional categories not included while performing the initial pair-wise comparison. For example, if the processor had compared first name, last name, address, and phone number during the initial comparison, during the second pair-wise comparison, the processor may include social security number, age, and/or any other information that may help narrow the identity. Following this second pair-wise comparison of the first, second, and third records, updated similarity scores are calculated for each comparison, (i.e., first-second, first-third, second-third) and the similarity scores are measured against a second predetermined threshold. If the updated similarity scores meet or exceed the second predetermined threshold, they are grouped according to the foregoing embodiments. If, however, the same situation persists, namely, the first-second records are similar, the second-third records are similar, but the first-third records are not, the second record will be grouped with either the first or third record depending on which pair-wise comparison has a higher updated similarity score. If the updated similarity scores are equal, another iteration of comparing additional columns begins.

In another embodiment, the processor may handle the conflicted grouping scenario by creating a copy of the second record. After making the copy, the processor may group the first and second records in a group A, and group the copy of the second record with the third record in a group B.

In yet another embodiment, the processor may handle the conflicted grouping scenario by creating a group based on the pair-wise comparisons of the second record. For example, based on the similarity scores between first-second and second-third records, all three records are grouped together based on their relationship to the second record.

At step 244, the processor determines the most prevalent identity within each group of similar records. For example, if the group of similar records contains 10 records and five of the records described an individual named James while the remaining five records included names such as Jim, Mike, or Harry, the processor would determine that James is the most prevalent name. In additional embodiments, the processor may require additional steps to determine the most prevalent identity within each group. For example, a situation may arise where a group of similar records contains six records, two describing an individual named Mike, two describing an individual named Michael, one describing an individual having the first initial "M", and the last record describing an individual named John. In such an embodiment, the processor may determine the most prevalent identity to be Michael, based on the relationship between the names Michael and Mike. In instances where there is no clear prevalent identity, additional categories (i.e., last name, address, email address, phone number, social security number, etc.) may be consulted to determine the most prevalent identity. In an embodiment where multiple sets of data records are compared, a data record of either the first or second set of data records may be modified or marked to indicate the most prevalent identity and/or the linked/grouped records. More specifically, the record may be modified such that a user may determine the most prevalent identities and/or linked data records upon reviewing a single set of data records.

At step 246, the processor modifies the identity of the similar records to match the identity of the most prevalent record within each group of similar records. We now relate back to the example provided above, where a group of similar records contained six records, two describing an individual named Mike, two describing an individual named Michael, one describing an individual having the first initial of "M", and the last record describing an individual named John. In this example, now at step 246, the processor modifies each of the records so the identity of each record describes an individual named "Michael". At step 248, after the identity for each similar group has been modified, record matching operation 228 is complete. This process is further illustrated in FIG. 3.

Figure 3:
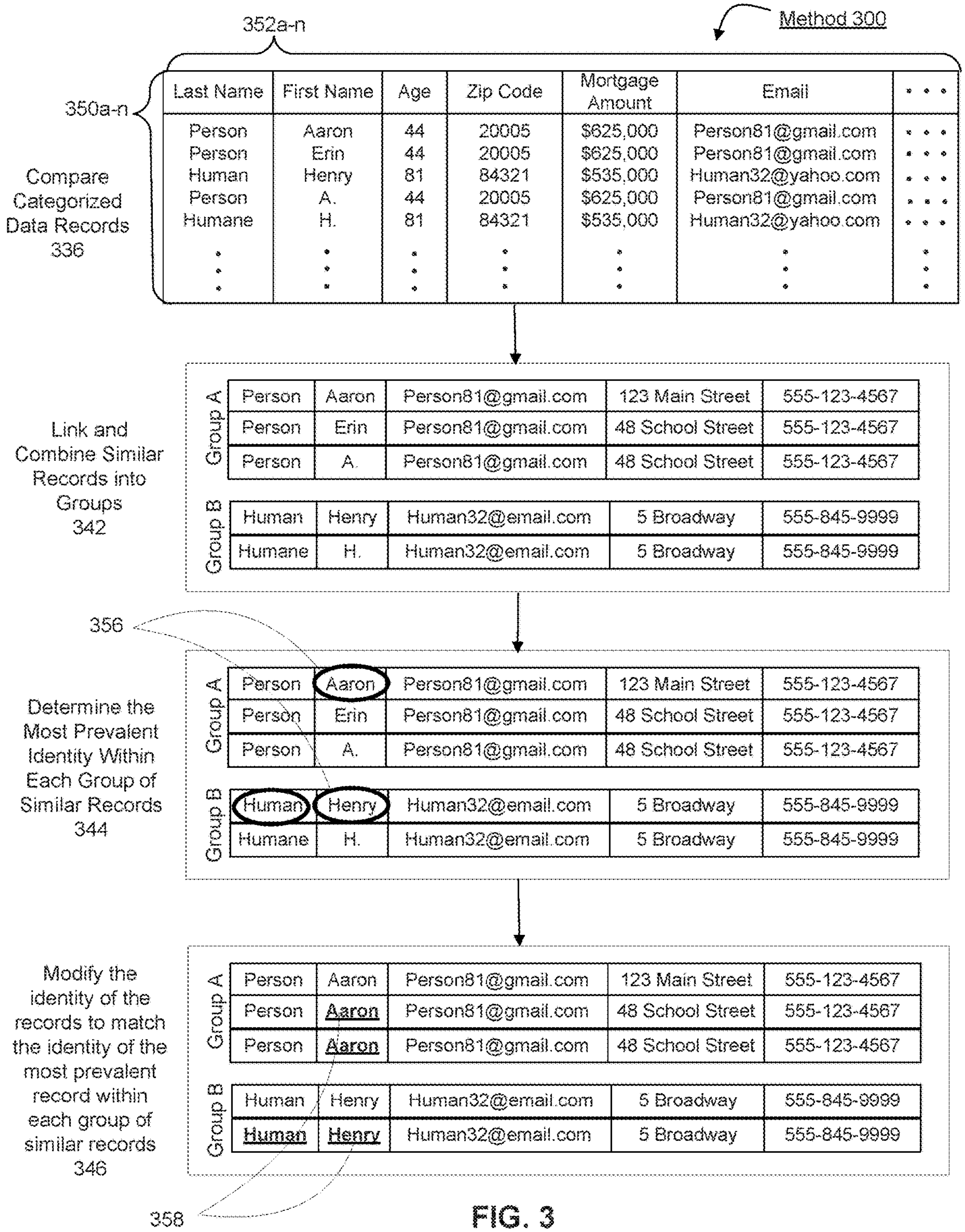
FIG. 3 depicts a flow diagram of an exemplary method for linking and matching data records.

FIG. 3 illustrates a flow diagram 300 illustrating an example operation, useful for implementing various embodiments of the present disclosure. As shown, diagram 300 illustrates an embodiment for a record matching operation, using embodiments of the foregoing system.

Diagram 300 illustrates data that has already been parsed, categorized, and normalized using either the parsing, assigning, and categorizing steps described above or using commonly known methods. As shown, the received categorized data has already been assigned to rows 350*a-n* and columns 352*a-n*. Each of rows 350*a-n* include information parsed from a data record that describes an individual. Each of columns 352*a-n* include categorized information that has been parsed and assigned to a predetermined category. As shown, there are only five rows and six columns, however, in various embodiments, it is contemplated that hundreds, thousands, millions, hundreds of millions, or more rows may be used, depending on the size of the data being processed. For example, in 2014 the US population exceeded 318 million people, approximately 77% of which were 18 years or older. It is understood that every US adult may make a political contribution, may have a purchasing history, may have a web-browsing history, etc. Thus, it is contemplated that the number of rows may reach, or exceed, any size required to accommodate such data. Likewise the number of columns may include hundreds, thousands, millions, hundreds of millions, or more categories based on the granularity and categories of information. In an embodiment, compression or encoding, such as sparse vector encoding, may be used to reduce the data size needed to store such vast amounts of data.

Now returning to the discussion describing FIG. 3. At step 336, a processor (such as processor 104 or computing device(s) 126 of FIG. 1) compares the categorized data of each record against all other categorized records using a pair-wise function. As described above, the processor may compare a single category, or alternatively, the processor may compare more than one category. In the embodiment shown, the processor compares five categories and enforces a similarity score threshold of 3/5 (or 60%).

Like above, the method depicted in FIG. 3 may also apply when comparing multiple sets of data records. For example, step 336 may also be performed using multiple sets of data records. Data records from a first set of records may be compared against data records from a second set of records. More specifically, the first set of data records may include a data record describing a person of interest or a list of persons of interest, while the second set of data records may be personal data records, lawfully stored in a database or memory.

At step 342, if the similarity score for at least two records meets or exceeds the similarity score threshold, the similar records (i.e., records that met or exceeded the similarity score threshold) are linked or combined into a group. As shown, based on the data provided in rows 350*a-n* and columns 352*a-n*, Groups A and B have been created. The number of possible groups is directly proportional to the number of rows being compared. As shown, Group A contains three records while Group B contains two records. Each record within the respective groups has met or exceeded the similarity score threshold ratio of 3/5 (or 60%) as compared to the other records within the group.

At step 344, the processor determines the most prevalent identity within each group of similar records. For example, in Group A, the processor compares the identities of "Aaron Person," "Erin Person," and "A. Person." Following the rules described above, the processor determines that "Aaron Person" is the most prevalent identity in Group A. In Group B, the processor compares the identities of "Henry Human" and "Henry Humane." Also following the rules described above, the processor determines that "Henry Human" is the most prevalent identity in Group B.

At step 346, the processor modifies the identity of records 358 to match the identity of the most prevalent record within the respective groups of similar records. As shown, the records of Group A have been modified to describe the identity of "Aaron Person," while the records of Group B have been modified to describe the identity of "Henry Human."

As described above regarding FIG. 3, the present disclosure contemplates processing vast amounts of data. In an embodiment, the processing may be completed by a single processor. However, based on the amount of data to be processed, as described above, it may take a single processor too long to complete the pair-wise comparison for each data records. As a result, in additional embodiments more processing power may be necessary. As was briefly described above, processor 104 comprises control module 110 (also called a controller). It was mentioned that depending on the current processing need, the control module can either recruit additional processors to aid in processing the data records or, alternatively, the control module may shut down the additional devices. We now turn to FIG. 4, which describes this controller operation in greater detail.

Figure 4:
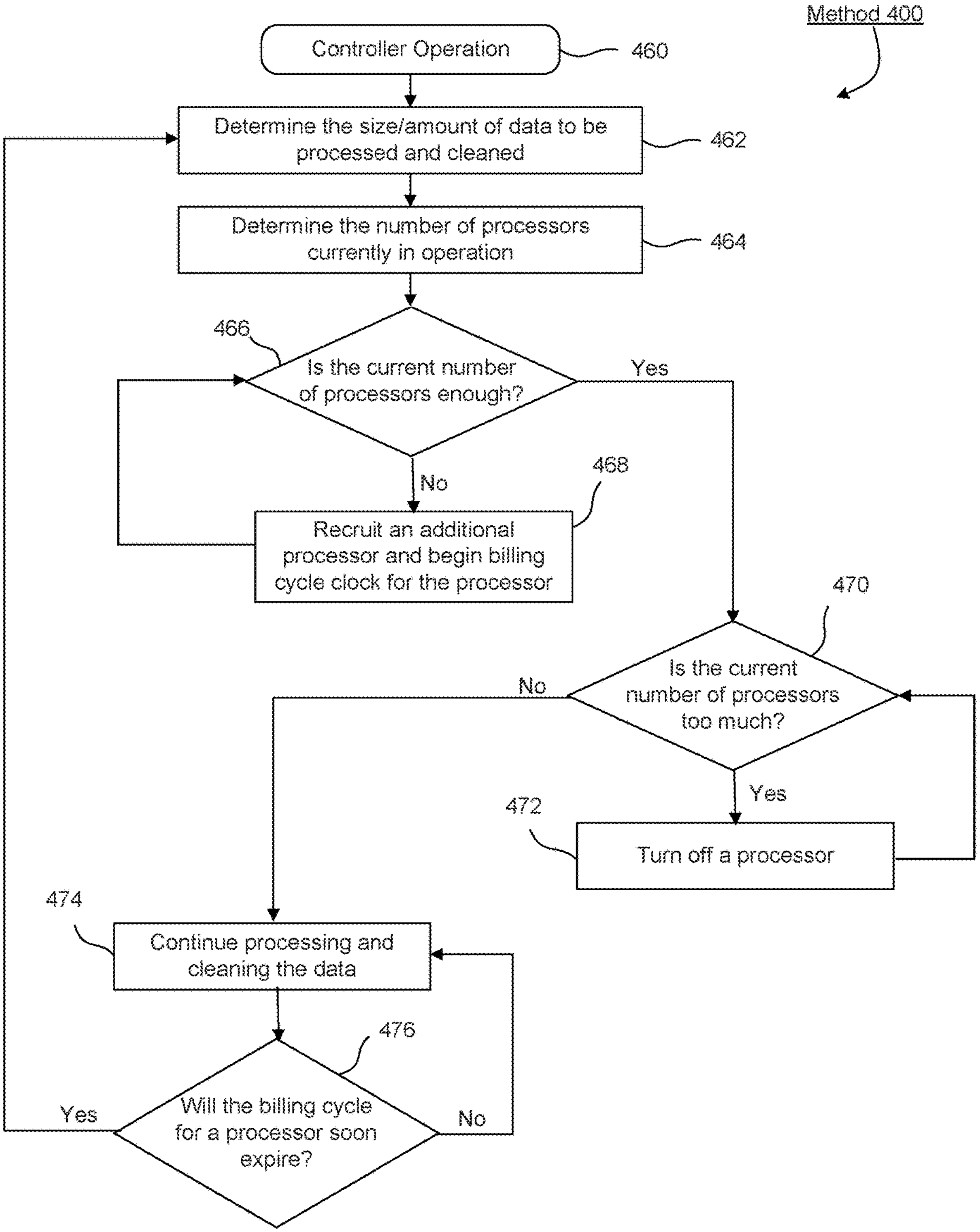
FIG. 4 depicts a flow chart diagram of an exemplary method for controlling at least one processor, using a controller operation.

FIG. 4 illustrates a flow chart diagram of an exemplary method 400, useful for implementing various embodiments of the present disclosure. As shown, method 400 describes an embodiment for controller operation 460, using embodiments of the foregoing system. For illustrative purposes, method 400 is sometimes described with respect to components of FIG. 1. However, it should not be limited thereto.

At step 462, control module 110, illustrated in FIG. 1, determines the size and amount of data to be processed. In an embodiment, this determination may be made by calculating the number of rows and the number of predetermined categories required to normalize the data. In an additional embodiment, this determination may be made by pre-allocating an estimated amount of memory either locally or externally and returning the amount of pre-allocated memory.

At step 464, the control module determines the number of processors currently in operation. For example, the control module resides on processor 104, but the control module may have already recruited additional processors from computing device(s) 126 to assist with the data processing needs. In an embodiment, the control module may constantly monitor the status of each recruited processor(s) using a unique identifier for each additional device, including the time where each additional device was recruited. In other embodiments, the control module may simply maintain a variable indicating the number of additional devices set aside to perform the processing.

At step 466, the control module determines whether the current number of processors meets the current processing needs of the obtaining, parsing, assigning, normalizing, and linking operations.

At step 468, if the current number of processors/computing devices does not meet the current demand, the control module will recruit an additional processor and return to step 466 to reevaluate whether the updated number of processors does not meet the current demand. In an embodiment, step 468 further includes beginning a billing cycle clock for the recruited processor.

At step 470, if the current number of processors meets the current demand, the control module determines whether the current number of processors exceeds the demand. Because the use of additional computing devices can be expensive, it may be desirable to limit the use of computing devices. In an embodiment, this determination may be made by calculating the efficiency of the processor, or computing device. A processor's efficiency may be determined by calculating the ratio of time the processor has been idle against the amount of time the processor has been active. In an additional embodiment, the control module may predict an expected amount of idle time in the future.

At step 472, if the current number of processors/computing devices exceeds the current demand, the control module may turn off a processor and return to step 470 to reevaluate whether the updated number of processors still exceeds the demand.

At step 474, if the current number of processors/computing devices meets the current demand, the control module allows each of the processors to continue processing and computing data in accordance with the foregoing embodiments.

At step 476, the control module determines whether a billing cycle for one, or more, of the processors will soon expire. More specifically, in embodiments where the additional processing power employs on-demand computing, a monetary fee may be accessed based on period of time. For example, in an embodiment where a third-party (i.e., on-demand) processor is used, the third-party may permit use of its device on a per hour basis. In such embodiments, at step 476, the control module will determine how long the third-party processor has been running. If use of the third-party processor is nearing the end of the processor's hour, the control module will return to step 462 and work through controller operation 460 to determine whether to continue using the third-party on-demand processor for another hour or whether to power-down the third-party processor based on the computing need and/or the third-party processor's efficiency. In embodiments where a third-party computing device is not used (i.e., when only local network processors are used), the same principles may apply in order to continually ensure that the devices are being used at a desired efficiency.

In this way, using the method in FIG. 4, the data mining method disclosed herein may be executed with only the minimum required processing power, saving costs. A non-limiting example of a contemplated data mining method, as illustrated in FIG. 5, shall now be discussed.

Figure 5:
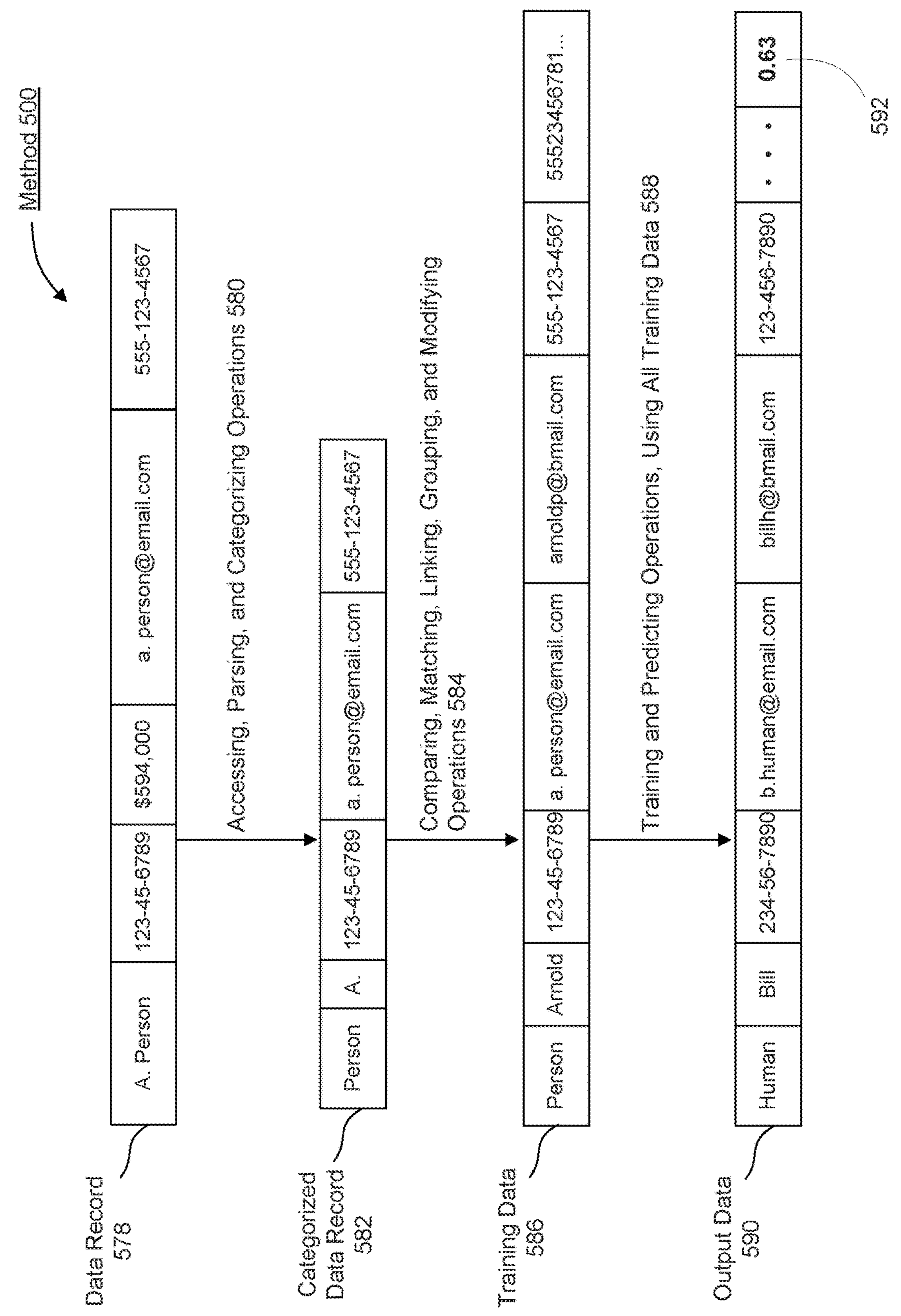
FIG. 5 depicts a flow diagram of an exemplary method for using a categorized and modified data record to predict behaviors of similar individuals.

FIG. 5 illustrates a flow diagram of an exemplary method 500, for predicting behaviors of individuals based on data produced/modified using various embodiments of the foregoing methods and systems.

As shown, FIG. 5 depicts the contents of an exemplary data record 578 describing an individual. In an embodiment, data record 578 may be income data; consumer data, such as an individual's purchasing history; web-browsing data, such as an individual's browsing and/or web-purchase history, tracked using first- or third-party cookies; an individual's mortgage history; or any other personal data that may be tracked or purchased through commonly used methods.

At step 580, a processor (such as processor 104 or computing device(s) 126 of FIG. 1) accesses, parses, and categorizes data record 278 in accordance with the foregoing embodiments, resulting in categorized data record 582.

At step 584, the processor compares categorized data record 582 against additional data records in order to determine whether categorized data record 582 should be linked, grouped, and modified to mirror the identity described by a separate data record, in accordance with the foregoing embodiments. Resulting from step 584 is training data 586.

At step 588, training data 586 is entered into a training system in order to compare and find individuals possessing similar interests, preferences, and other demographic data. Step 588 further includes predicting future behaviors of similar individuals, based on an order of similarity between the individuals. For example, after comparing the training data 586 against additional data records, an outcome score may be calculated. An outcome score correlates to the order of similarity between an individual and his/her likelihood to perform a specific action. Step 588 returns output data 590, having outcome score 592.

While the foregoing figures illustrate records describing various individuals, in an embodiment, the foregoing techniques may also be used to access, parse, categorize, compare, link, group, and/or modify records describing an entity. For example, the techniques can be used to match incongruent entity names.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:

assigning, by one or more processors, a data record of an individual to a predetermined category;

allocating, by the one or more processors based on the predetermined category, an amount of memory to process the assigned data record;

in response to the amount of memory being allocated, training, by the one or more processors, a training system using the assigned data record to identify further individuals possessing similar demographic data as the individual to which the data record belongs;

identifying, by the one or more processors, the further individuals by processing further data records of individuals using the trained training system;

predicting, by the one or more processors using the trained training system, future behaviors of the further individuals based on an order of similarity between the further individuals and the individual; and generating, by the one or more processors using the trained training system, an outcome score that correlates to the order of similarity to identify the further individuals that perform the future behaviors.

2. The computer-implemented method of claim 1, wherein the data record comprises: income data, consumer data, web-browsing data, or an individual's mortgage history.

3. The computer-implemented method of claim 1, further comprising accessing, by the one or more processors, a data record describing the individual.

4. The computer-implemented method of claim 1, further comprising comparing, by the one or more processors, the assigned data record against other data records stored in a database using a pair-wise function in order to determine that the assigned data record is linked, grouped, or modified to mirror an identity described by a separate data record of the other data records.

5. The computer-implemented method of claim 1, further comprising linking, grouping, or modifying the assigned data record to a separate data record when a pair-wise function results in a similarity score exceeding a predetermined threshold.

6. The computer-implemented method of claim 1, further comprising:

determining, by the one or more processors, that a current number of the one or more processors meets a current processing need of at least one of obtaining, parsing, assigning, normalizing, or linking operations; and employing, by the one or more processors, an additional processor based on the current processing need not being satisfied, or turning off, by the one or more processors, a current processor based on the current processing need being satisfied.

7. The computer-implemented method of claim 1, further comprising determining, by the one or more processors, a continuation of using a third-party processor based on analyzing a current efficiency of the third-party processor, wherein the current efficiency is determined based on analyzing at least one of a size and amount of the data record to be processed or a number of the third-party processor currently in operation.

8. A non-transitory computer readable medium storing instructions that when executed by one or more processors causes the one or more processors to perform operations comprising:

assigning a data record of an individual to a predetermined category;

allocating, based on the predetermined category, an amount of memory to process the assigned data record;

in response to the amount of memory being allocated, training a training system using the assigned data record to identify further individuals possessing similar demographic data as the individual to which the data record belongs;

identifying the further individuals by processing further data records of individuals using the trained training system;

predicting, using the trained training system, future behaviors of the further individuals based on an order of similarity between the further individuals and the individual; and generating, using the trained training system, an outcome score that correlates to the order of similarity to identify the further individuals that perform the future behaviors.

9. The non-transitory computer readable medium of claim 8, wherein the data record comprises: income data, consumer data, web-browsing data, or an individual's mortgage history.

10. The non-transitory computer readable medium of claim 8, wherein the operations further comprise accessing a data record describing the individual.

11. The non-transitory computer readable medium of claim 8, wherein the operations further comprise comparing the assigned data record against other data records stored in a database using a pair-wise function in order to determine that the assigned data record is linked, grouped, or modified to mirror an identity described by a separate data record of the other data records.

12. The non-transitory computer readable medium of claim 8, wherein the operations further comprise linking, grouping, or modifying the assigned data record to a separate data record when a pair-wise function results in a similarity score exceeding a predetermined threshold.

13. The non-transitory computer readable medium of claim 8, wherein the operations further comprise:

determining that a current number of the one or more processors meets a current processing need of at least one of obtaining, parsing, assigning, normalizing, or linking operations; and employing an additional processor based on the current processing need not being satisfied, or turning off a current processor based on the current processing need being satisfied.

14. The non-transitory computer readable medium of claim 8, wherein the operations further comprise determining a continuation of using a third-party processor based on analyzing a current efficiency of the third-party processor, wherein the current efficiency is determined based on analyzing at least one of a size and amount of the data record to be processed or a number of the third-party processor currently in operation.

15. A computing system, comprising:

a memory storing instructions;

one or more processors, coupled to the memory, configured to process the stored instructions to:

assign a data record of an individual to a predetermined category;

allocate, based on the predetermined category, an amount of memory to process the assigned data record;

in response to the amount of memory being allocated, train a training system using the assigned data record to identify further individuals possessing similar demographic data as the individual to which the data record belongs;

identify the further individuals by processing further data records of individuals using the trained training system;

predict, using the trained training system, future behaviors of the further individuals based on an order of similarity between the further individuals and the individual; and generate, using the trained training system, an outcome score that correlates to the order of similarity to identify the further individuals that perform the future behaviors.

16. The computing system of claim 15, wherein the data record comprises: income data, consumer data, web-browsing data, or an individual's mortgage history.

17. The computing system of claim 15, wherein the one or more processors are further configured to compare the assigned data record against other data records stored in a database using a pair-wise function in order to determine that the assigned data record is linked, grouped, or modified to mirror an identity described by a separate data record of the other data records.

18. The computing system of claim 15, wherein the one or more processors are further configured to link, group, or modify the assigned data record to a separate data record when a pair-wise function results in a similarity score exceeding a predetermined threshold.

19. The computing system of claim 15, wherein the one or more processors are further configured to:

determine that a current number of the one or more processors meets a current processing need of at least one of obtaining, parsing, assigning, normalizing, or linking operations; and employ an additional processor based on the current processing need not being satisfied, or turning off a current processor based on the current processing need being satisfied.

20. The computing system of claim 15, wherein the one or more processors are further configured to determine a continuation of using a third-party processor based on analyzing a current efficiency of the third-party processor, wherein the current efficiency is determined based on analyzing at least one of a size and amount of the data record to be processed or a number of the third-party processor currently in operation.

* * * * *